(12) United States Patent
Maldera

(10) Patent No.: US 8,668,392 B2
(45) Date of Patent: Mar. 11, 2014

(54) ROLLING CONTACT BEARING

(75) Inventor: Carlo Maldera, Giaveno (IT)

(73) Assignee: Aktiebolaget SKF, Gothenburg (SE)

( * ) Notice: Subject to any disclaimer, the term of this patent is extended or adjusted under 35 U.S.C. 154(b) by 0 days.

(21) Appl. No.: 13/444,347

(22) Filed: Apr. 11, 2012

(65) Prior Publication Data
US 2012/0269475 A1 Oct. 25, 2012

(30) Foreign Application Priority Data

Apr. 22, 2011 (IT) .................................. TO11A0360

(51) Int. Cl.
F16C 35/067 (2006.01)

(52) U.S. Cl.
USPC .......................................... 384/542; 384/903

(58) Field of Classification Search
USPC .................... 384/537, 539, 542, 903
See application file for complete search history.

(56) References Cited

U.S. PATENT DOCUMENTS

| 1,908,295 | A | * | 5/1933 | Leister | 384/542 |
| 3,506,317 | A | * | 4/1970 | Angeli | 384/542 |
| 3,767,279 | A | | 10/1973 | Hallerback | |
| 3,938,864 | A | | 2/1976 | Haussels | |
| 6,007,253 | A | * | 12/1999 | Rutter | 384/539 |
| 7,374,345 | B2 | * | 5/2008 | Ilie et al. | 384/537 |

FOREIGN PATENT DOCUMENTS

| DE | 19957709 A1 | 6/2000 |
| EP | 2020309 A2 | 2/2009 |
| FR | 2209424 A5 | 6/1974 |

* cited by examiner

Primary Examiner — Thomas R Hannon
(74) Attorney, Agent, or Firm — Bryan Peckjian; SKF USA Inc. Patent Dept.

(57) ABSTRACT

A rolling contact bearing (1) providing a radially inner ring (2) into which a shaft of a pinion unit can engage, a radially outer ring (3) which can be inserted into a cylindrical seat (4) provided in a frame (5), a plurality of rolling bodies (6) arranged between the two rings (2, 3) so as to allow the radially inner ring (2) to rotate with respect to the radially outer ring (3), and an axial locking element (10) which is mounted on a lateral annular recess obtained in the radially outer ring (3) and can be screwed to the frame (5) so as to axially lock the radially outer ring (3) within the cylindrical seat (4); an axial retaining element (37), is associated with the radially outer ring (3) and radially interferes with the locking element (10) so as to secure the locking element (10) within the annular recess (11).

6 Claims, 1 Drawing Sheet

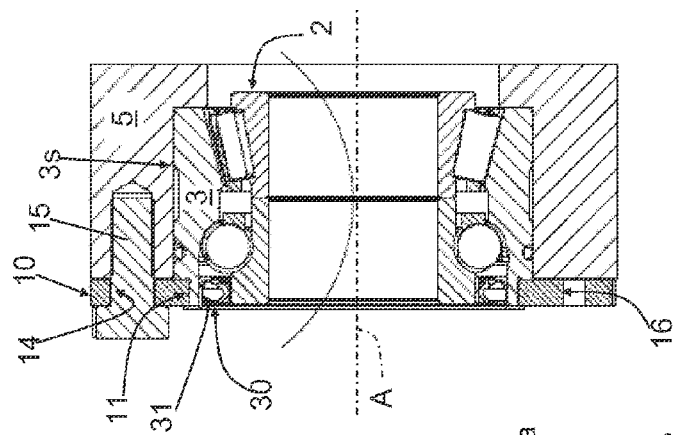
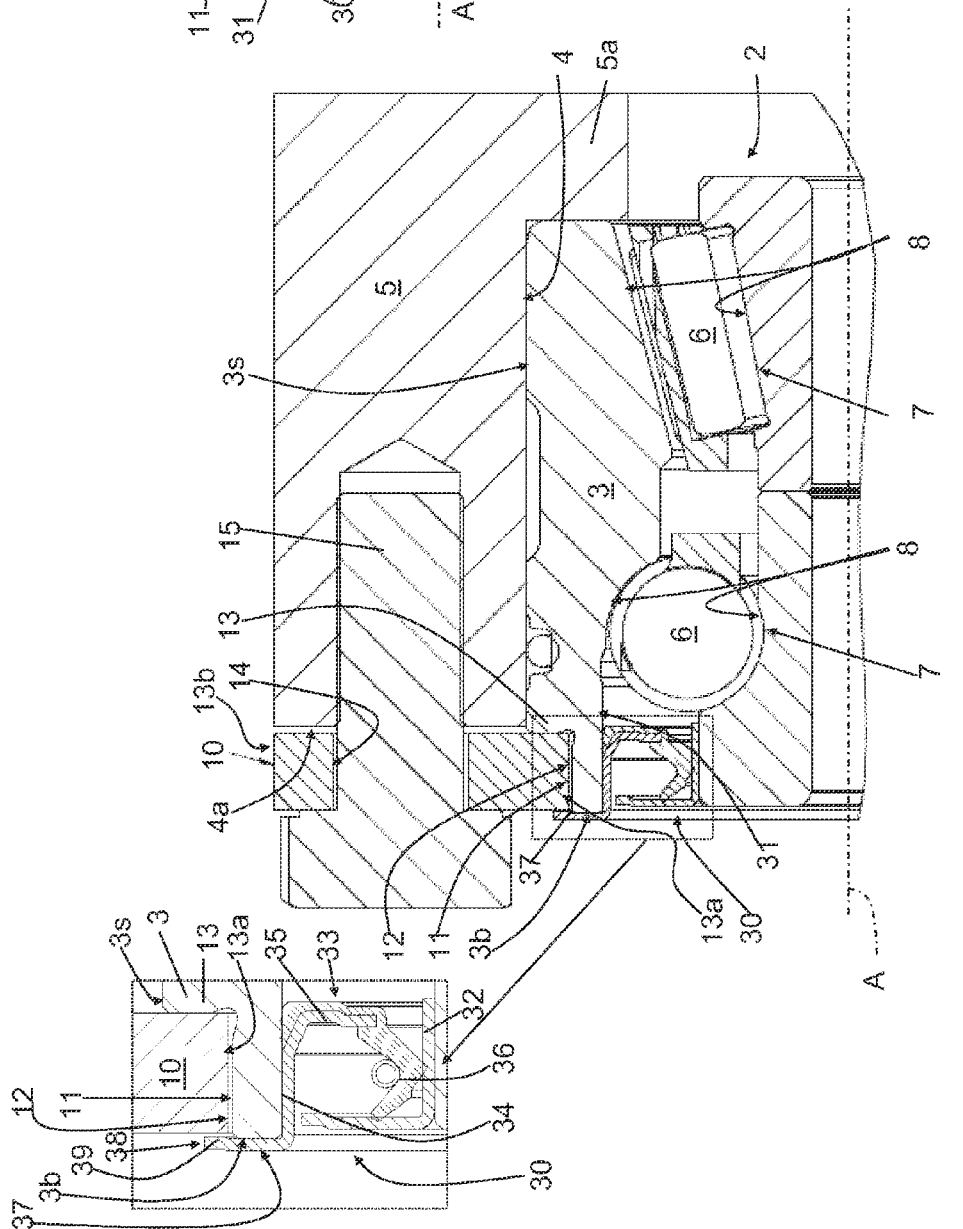

ROLLING CONTACT BEARING

CROSS-REFERENCE TO RELATED APPLICATION

This U.S. Non-Provisional Utility application claims the benefit of copending Italy Provisional Patent Application Serial No. TO2011A000360, filed on 22 Apr. 2011, which is incorporated herein in its entirety.

FIELD OF THE INVENTION

The present invention relates to a rolling contact bearing. Particularly, the present invention relates to a rolling contact bearing element for mechanical units, such as, for example, pinion units, to which the ensuing description will make explicit reference without thereby losing generality.

SUMMARY OF THE INVENTION

Pinion units of commonly known design comprise a shaft and a pinion integral or formed as a single piece with the shaft; the pinion units are rotatably supported within a respective cylindrical seat arranged in a frame of the pinion unit by the interposition of a rolling contact bearing. The bearing comprises a radially inner ring adapted to be engaged by the shaft, a radially outer ring adapted to be inserted with radial interference in the cylindrical seat, a plurality of rolling elements interposed between the two rings to allow rotation of the radially inner ring with respect to the radially outer ring, and an axial locking element adapted for being screwed to the frame so as to axially lock the radially outer ring within the housing.

As a rule, the axial locking element is defined by an annular cap, which can be alternately coupled to the bearing after mounting the bearing inside the cylindrical seat, i.e. placed in axial abutment both against the radially outer ring and the frame before being fastened to the frame or it can be coupled directly to the bearing before mounting. In the first case, the annular locking cap is an additional element, separate from the bearing, and whose geometric characteristics shall only comply with the need to provide an outer shoulder for the central seat to prevent the bearing from coming out of its central seat.

In the second case, conversely, the annular locking cap represents a complementary element to the bearing, as it is mounted on a front annular recess formed in the radially outer ring and is placed axially against a shoulder delimiting the annular front recess.

Whereas the first type of annular locking cap has the drawback of having to be mounted during the pinion unity assembling step, thereby lengthening the cycle time for mounting the pinion unit, the second type of assembly, while being free of this drawback, nevertheless suffers from other inconveniences that emerge especially during transport of the bearing. In fact, the annular mounting cap, after being placed on the front annular recess of the radially outer ring, tends to detach from the bearing as a result of vibrations during transport, therefore nullifying the benefits of such preassembly.

The object of the present invention is to provide a rolling contact bearing, which does not suffer from the above-described drawbacks.

According to the present invention, there is provided a rolling contact bearing having the features set forth in the appended claims.

BRIEF DESCRIPTION OF THE DRAWINGS

An exemplary, non-limiting embodiment of the invention will now be described with reference to the accompanying drawings, in which:

FIG. 1 is a vertical, axial cross-sectional view of a preferred embodiment of the rolling contact bearing of the present invention; and FIG. 2 is a vertical, axial cross-sectional view to an enlarged scale of the rolling contact bearing of FIG. 1.

DETAILED DESCRIPTION OF THE INVENTION

With reference to FIG. 1, a rolling contact bearing is designated overall at 1.

The bearing 1 has an axis of rotation A and includes:
an inner ring 2 coaxial to the axis A and adapted to be engaged by a shaft of a pinion unit (not shown),
an outer ring 3 radially arranged outside the inner ring 2 with respect to the axis A and adapted to be inserted in a cylindrical seat 4 provided in a frame 5 and adjacent to a shoulder 5a inside the seat 4, and
a plurality of rolling bodies 6 interposed between the two rings 2 and 3 so as to allow rotation of the inner ring 2 with respect to the outer ring 3.

In the illustrated embodiment, the inner ring 2 consists of two half-rings axially side by side, and the rolling bodies 6 are arranged in two rows 7 spaced around the axis A so as to roll inside respective raceways 8 axially separated from each other and obtained both on the outside of the inner ring 2 and on the inside of the outer ring 3. Preferably, the rolling bodies are defined by tapered rollers as per the innermost row 7, that is the row on the pinion side, and are defined by spherical rolling elements as per the outer row 7, that is the row on the shaft side.

The bearing 1 further comprises an axial locking element 10, which is mounted in a mounting seat 11 formed in the outer ring 3, and is adapted to be fixed to the frame 5 in order to axially lock the outer ring 3 within the cylindrical seat 4, cooperating with the shoulder 5a. In particular, the seat 11 is defined by a side annular recess, which is obtained starting from a cylindrical outer surface 3s of the outer ring 3 and extends axially into the outer ring 3 starting from a annular side surface 3b of the outer ring 3. In addition, the seat 11 is radially delimited towards the outside by a cylindrical surface 12; the seat 11 is axially delimited on the side of the frame by a shoulder 13 against which the locking element 10 is disposed in axial abutment. The seat 11 extends along the surface 3s through an axial depth of dimensions being substantially equal to an axial thickness of the element 10.

In the embodiment shown in FIG. 1 and, in detail, in FIG. 2, the locking element 10 is defined by an annular cap delimited internally by a cylindrical surface 13a having an inner diameter substantially equal to the size of the outer diameter of the mounting seat 11, and externally by a cylindrical surface 13b having an outer diameter larger than the size of the inner diameter of the surface 13a. Due to this dimensioning, the locking element 10 or cap 10 can be mounted in the seat 11 without being forced and, therefore, without that its presence may bring inadmissible and unwanted stresses and deformations in the bearing 1.

The cap 10 is adapted to be placed in axial abutment against a front surface 4a which delimits an inlet of the seat 4. The portion of the cap 10 bounded by the two surfaces 13a and 13b, further provides at least one through bore 14 for the insertion of a respective screw 15 to be screwed into the frame 5 in order to secure the cap 10 to the frame 5 and against the surface 4a. According to requirements, the cap 10 could be provided with two or three bores 14 for other respective screws 15. The cap 10 further provides an additional centering through bore 16 placed in a position diametrically opposite to the bore 14.

The bearing 1 comprises, finally, a sealing device 30, which is arranged within an annular window 31 defined by the inner ring 2 and the outer ring 3. The sealing device 30 comprises a shaped shield 32 L-shaped when viewed in an axial cross-section, and forcefully fitted onto the ring 2. The bearing 1 also comprises a further shaped shield 33 which is mounted in the outer ring 3 in a position facing the shield 32 and includes:

- a cylindrical portion 34 forcefully fitted internally to the outer ring 3;
- a flanged portion 35 extending from the portion 34 towards the axis A and transversely to axis A; and
- a sealing lip 36 integral with the flanged portion 35 and arranged in sliding contact with the shield 32.

The shield 33 also comprises an annular extension 37, which is arranged in axial abutment against the annular side surface 3b of the outer ring 3 and is connected to the outer cylindrical portion 34 on the opposite side of the flanged portion 35.

The annular extension 37 is radially delimited on the outside by an annular free edge 38 having an outer diameter larger than the size of an internal diameter of the cap 10 and extending radially beyond the cylindrical surface 12 that delimits the seat 11.

The annular extension 37 radially interferes with the cap 10, i.e. radially overlaps the cap 10, and defines an element for axially retaining the cap 10 within the seat 11. In fact, once the cap 10 has been mounted in the seat 11 abutting against the shoulder 13, and that the sealing device 30 is been placed inside the annular window 31 between the rings 2 and 3, the extension 37 is simultaneously positioned close to both the surface 3b and the cap 10, preventing the cap 10 from coming out of the seat 11.

Since the extension 37 serves to prevent disassembly of the cap 10 from the seat 11 during transport of the bearing 1, it is not strictly necessary for the cap to be in abutment with the cap 10, while it is necessary that that cap abuts against the surface 3b, since this mutual positioning also determines the axial positioning of the device 30.

However, in order to bring the extension 37 closer to the cap 10 and stiffen the structure of the same extension 37, this can be provided with a stiffening rib 39, which substantially extends over a whole free portion of the extension 37, that is a portion which extends radially beyond the surface 11, and is so shaped as to define a recess of the extension 37 towards the seat 11.

It is understood that the invention is not limited to the embodiment described and illustrated herein, which is to be considered as an exemplary implementation of the rolling contact bearing, which is instead subject to further modifications relating to shapes and arrangements of parts, constructional and assembling details.

What I claim is:

1. A rolling contact bearing comprising:
   a radially inner ring into which a shaft of a pinion unit can engage,
   a radially outer ring which can be inserted into a cylindrical seat provided in a frame,
   a plurality of rolling bodies arranged between the two rings so as to allow the radially inner ring to rotate with respect to the radially outer ring, and
   an axial locking element which is mounted on a lateral annular recess obtained in the radially outer ring, wherein
   the axial locking element can be screwed to the frame so as to axially lock the radially outer ring within the cylindrical seat, wherein
   the bearing includes axial retaining means, which are associated with the radially outer ring and radially interfere with the locking element so as to secure the locking element within the annular recess, and
   a sealing element, which is arranged within an annular window defined by the radially inner ring and by the radially outer ring and includes a shaped shield mounted in the radially outer ring, wherein
   the shaped shield being provided with an annular extension which defines the said axial retaining means.

2. The bearing according to claim 1, wherein the annular extension is radially outwardly delimited by a free annular edge, the outer diameter of which is greater than an inner diameter of the axial locking element.

3. The bearing according to claim 2, wherein the sealing element comprises a sealing lip integral with a flanged portion of the shaped shield.

4. The bearing according to claim 3, wherein the shaped shield comprises a cylindrical portion which is forcefully fitted internally to the radially outer ring and is connected on one side to the annular extension and on an axially opposite side to the flanged portion.

5. The bearing according to claim 4, wherein the annular extension is arranged axially in the vicinity of a front annular surface of the radially outer ring.

6. The bearing according to claim 5, wherein the annular extension is provided with a stiffening rib.

* * * * *